(12) United States Patent
Vickers et al.

(10) Patent No.: US 11,435,328 B2
(45) Date of Patent: Sep. 6, 2022

(54) UNIONS AND COUPLERS

(71) Applicant: Agilent Technologies, Inc., Santa Clara, CA (US)

(72) Inventors: Allen K. Vickers, Folsom, CA (US); Ngoc A Thi Dang, Middleburg (NL); David Jantz, Folsom, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 268 days.

(21) Appl. No.: 16/804,919

(22) Filed: Feb. 28, 2020

(65) Prior Publication Data

US 2021/0270787 A1 Sep. 2, 2021

(51) Int. Cl.
*G01N 30/60* (2006.01)
*G01N 30/02* (2006.01)

(52) U.S. Cl.
CPC ..... *G01N 30/6047* (2013.01); *G01N 30/6034* (2013.01); *G01N 30/6039* (2013.01); *G01N 30/6043* (2013.01); *G01N 2030/025* (2013.01)

(58) Field of Classification Search
CPC ......... G01N 2030/025; G01N 30/6004; G01N 30/6034; G01N 30/6039; G01N 30/6043; G01N 30/6047; F16L 31/00–02
USPC .............................. 248/200.1; D24/224–226
See application file for complete search history.

(56) References Cited

U.S. PATENT DOCUMENTS

| | | | | |
|---|---|---|---|---|
| 2,003,732 A * | 6/1935 | Bins | ........................ | E21F 1/06 285/321 |
| 2,122,925 A * | 7/1938 | Bins | ........................ | F16L 31/00 285/321 |
| 4,713,963 A * | 12/1987 | Sharp | ................. | G01N 30/7206 73/23.37 |
| 4,876,005 A | 10/1989 | America | | |
| 5,601,785 A | 2/1997 | Higdon | | |
| 6,730,216 B2 | 5/2004 | Heringa et al. | | |
| D757,957 S * | 5/2016 | Moshfegh | .......... | G01N 30/6047 D24/232 |
| 2007/0084982 A1* | 4/2007 | Martone | ............ | G01N 30/6047 248/316.8 |
| 2009/0014373 A1* | 1/2009 | Choikhet | ........... | G01N 30/6047 210/198.2 |
| 2010/0005855 A1 | 1/2010 | Silva et al. | | |

(Continued)

FOREIGN PATENT DOCUMENTS

WO 2019-038652 2/2019

OTHER PUBLICATIONS

Agilent LC Capillary Supplies Selection Guide (Year: 2013).*
CHROMalytic TECHnology, GC Accessories | Gas Purification Essentials Fittings (Year: 2011).*
Restek Corporation, Vu2 Union™ & new SeCure™ "Y"Connectors (Year: 2004).*

(Continued)

*Primary Examiner* — David L Singer
(74) *Attorney, Agent, or Firm* — Mannava & Kang, P.C.; Adesh Bhargava (57) ABSTRACT

One aspect of the invention provides a gas chromatography union including: a first port; a second port in fluid communication with the first port; and a first pair of wings defining a first recess. Another aspect of the invention provides a union including: a first port; a second port in fluid communication with the first port; and at least a first protrusion defining a first recess. Another aspect of the invention provides a coupler including: a first port; a second port in fluid communication with the first port; and a first connector positioned on a portion of a surface of the coupler.

14 Claims, 12 Drawing Sheets

(56) References Cited

U.S. PATENT DOCUMENTS

| | | | | |
|---|---|---|---|---|
| 2012/0228872 | A1* | 9/2012 | Gamache | G01N 30/6026 |
| | | | | 285/331 |
| 2013/0306563 | A1* | 11/2013 | Blaschyk | B01D 15/22 |
| | | | | 210/656 |
| 2014/0260564 | A1 | 9/2014 | Beemer | |
| 2014/0261838 | A1* | 9/2014 | Beemer | B01L 3/563 |
| | | | | 138/109 |
| 2015/0323509 | A1* | 11/2015 | Kirby | G01N 30/30 |
| | | | | 210/175 |
| 2015/0369402 | A1* | 12/2015 | Pa | G01N 30/6039 |
| | | | | 285/386 |
| 2018/0100837 | A1* | 4/2018 | Nielsen | G01N 30/6039 |
| 2020/0386139 | A1* | 12/2020 | Albonico | F01N 3/2066 |

OTHER PUBLICATIONS

International Search Authority, "The International search report and written opinion, PCT Application No. PCT/US2021/019577", dated Jun. 15, 2021, 10 pages.

Agilent Technologies, Capillary Flow Technology: Deans Switch, Increase the Resolving Power of Your GC, The Measure of Confidence, 2013, 8 pages.

Agilent Technologies, Agilent Ultimate Union Kits (G3182-61580 and G3182-61581), 2013, 12 pages.

Sheffield Hallam University, Gas Chromatography, https://teaching.shu.ac.uk/hwb/chemistry/tutorials/chrom/gaschrm.htm#, downloaded Feb. 5, 2020, 5 pages.

Wikipedia, Gas chromatography, https://en.wikipedia.org/wiki/Gas_chromatography, downloaded Feb. 6, 2020, 14 pages.

* cited by examiner

UNIONS AND COUPLERS

BACKGROUND OF THE INVENTION

It is sometimes necessary to couple multiple gas chromatography columns (e.g., to achieve increased column length). A simple union can be utilized to couple two columns. Multi-port connectors can also be used to couple multiple columns (e.g., split the sample stream flowing from a single primary column into two parallel columns). However, current configurations of two-port or multi-port connectors can leak, be difficult to install, and/or adversely affect chromatographic performance.

Glass or fused silica press fit unions are difficult to make leak-free. Moreover, even when successfully attached, they are not mechanically robust. As such, these unions are prone to leaking after short periods of use. This is due, in part, to the inadequate methods that are available for securing the glass unions inside the GC oven where high velocity air currents, in conjunction with multiple-temperature cycling, will cause the column to fracture at the sealing junctures between the column and the conical glass-to-column interface that is the location for the press-fit seal. These factors require these column connectors to have limited to moderately low upper-temperature limits, thus limiting the range of suitable applications.

Other unions are bulky and difficult to attach to the columns. Such unions are also subject to thermal lag inside of the gas chromatography oven due to excessive metal mass that causes chromatographic anomalies (e.g., loss of efficiency, peak tailing). Similarly, these bulky unions are also prone to fail (e.g., leak, cause solute breakdown) where it is difficult to find a suitable means to secure the unions and still prevent mechanical failure of the connections.

SUMMARY OF THE INVENTION

One aspect of the invention provides a gas chromatography union including: a first port; a second port in fluid communication with the first port; and a first pair of wings defining a first recess.

This aspect of the invention can have a variety of embodiments. The gas chromatography union can further include a second pair of wings defining a second recess adapted for engagement with a second portion of the gas chromatography column cage.

The first recess can be positioned at an angle of from about 45 degrees to about 270 degrees relative to at least one of the first port or the second port.

Each of the first port and second port can include at least a substantially conical section. Each of the first port and second port can include at least one substantially conical section and at least one substantially cylindrical section.

The gas chromatography union can include a material having a thermal conductivity of less than about $$250 \frac{W}{m \cdot K}.$$

The gas chromatography union can consist of stainless steel.

The gas chromatography union can further include an indicator that indicates a size of columns that the chromatography union is capable of coupling to one another.

The gas chromatography union can further include a third port in fluid communication with the first port and the second port. The third port can be co-planar with both the first port and the second port. The third port can be perpendicular to both the first port and the second port.

Another aspect of the invention provides a union including: a first port; a second port in fluid communication with the first port; and at least a first protrusion defining a first recess.

This aspect of the invention can have a variety of embodiments. The first recess can define an internal geometric shape that allows the union to be integrated into the GC column cage. The first recess can be at an angle of from about 45 degrees to about 270 degrees relative to at least one of the first port or the second port.

The union can further include at least a second protrusion defining a second recess.

The union can further include an indicator that indicates a size of columns that the union is capable of coupling to one another.

Another aspect of the invention provides a coupler including: a first port; a second port in fluid communication with the first port; and a first connector positioned on a portion of a surface of the coupler.

This aspect of the invention can have a variety of embodiments. The first connector can be one of a friction-fit connector or a snap-fit connector. The coupler can further include an indicator that indicates a size of columns that the coupler is capable of connecting to one another.

The coupler can further include a second connector positioned on a portion of the surface of the coupler.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIGS. 7A-8B provide views of a three-port connector or splitter union according to embodiments of the invention.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Aspects of the invention provide unions for use in gas chromatography systems.

Figure 1:
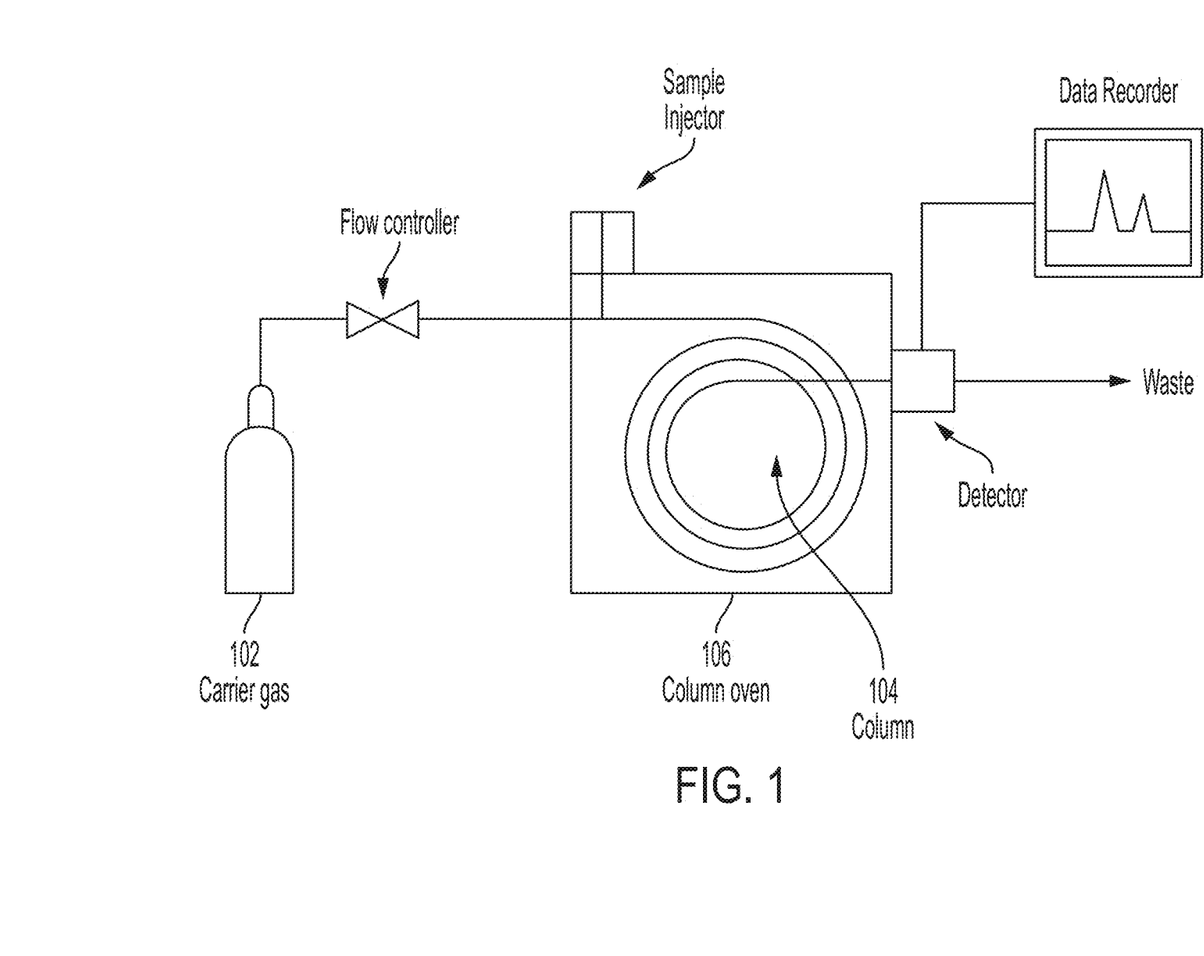
FIG. 1 depicts a gas chromatography system.

Gas chromatography is a type of chromatography used in analytical chemistry for separating and analyzing compounds that can be vaporized without decomposition. Referring to FIG. 1, gas chromatography uses a carrier gas 102 as a mobile phase and a stationary phase. The stationary phase is a layer of liquid or polymeric material coated on the inside of a length of fused-silica or metal tubing called a column 104.

Typically, the phase coating can range from about 0.10 microns to about 10 microns or more in thickness. However, a suitable length of column 104 may not be coated with any stationary phase, but can optionally have only a chemically deactivated surface. That is, the length of column 104 can be free of any surface alterations on the inside surface of the tubing. In some examples, lengths of uncoated tubing are attached before or after a coated column as a "guard column" or "retention gap".

Figure 2:
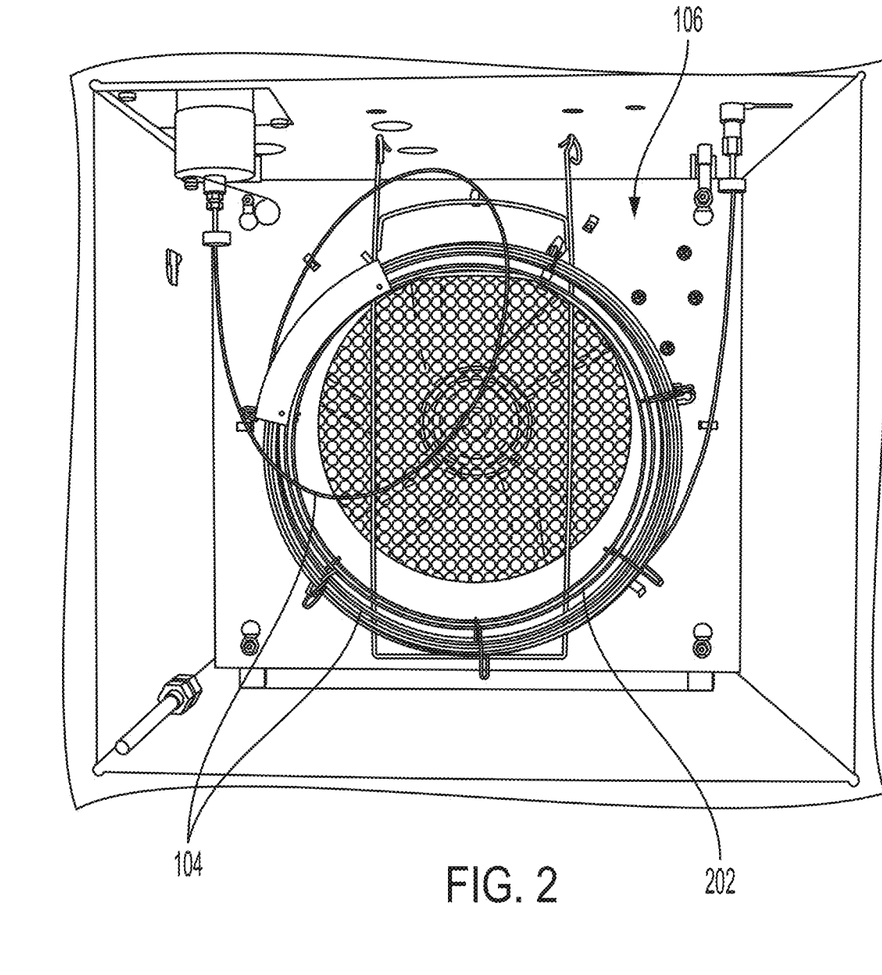
FIG. 2 depicts a gas chromatography oven, open to show a capillary column.

As seen in FIGS. 1 and 2, the column 104 is of a length (e.g., between about 0.5 m and about 100 m) that it must be coiled to fit into an oven 106. Referring to FIG. 2, the column 104 is typically wrapped around a cage 202 in order to maintain the coiled configuration, but other configurations (e.g., toroidal, planar) exist.

It is sometimes necessary to couple multiple gas chromatography columns 104 (e.g., to achieve increased column length). A union can be utilized to couple two or more columns 104. However, unions can leak, be difficult to install, and/or adversely affect chromatographic performance.

Figure 3:
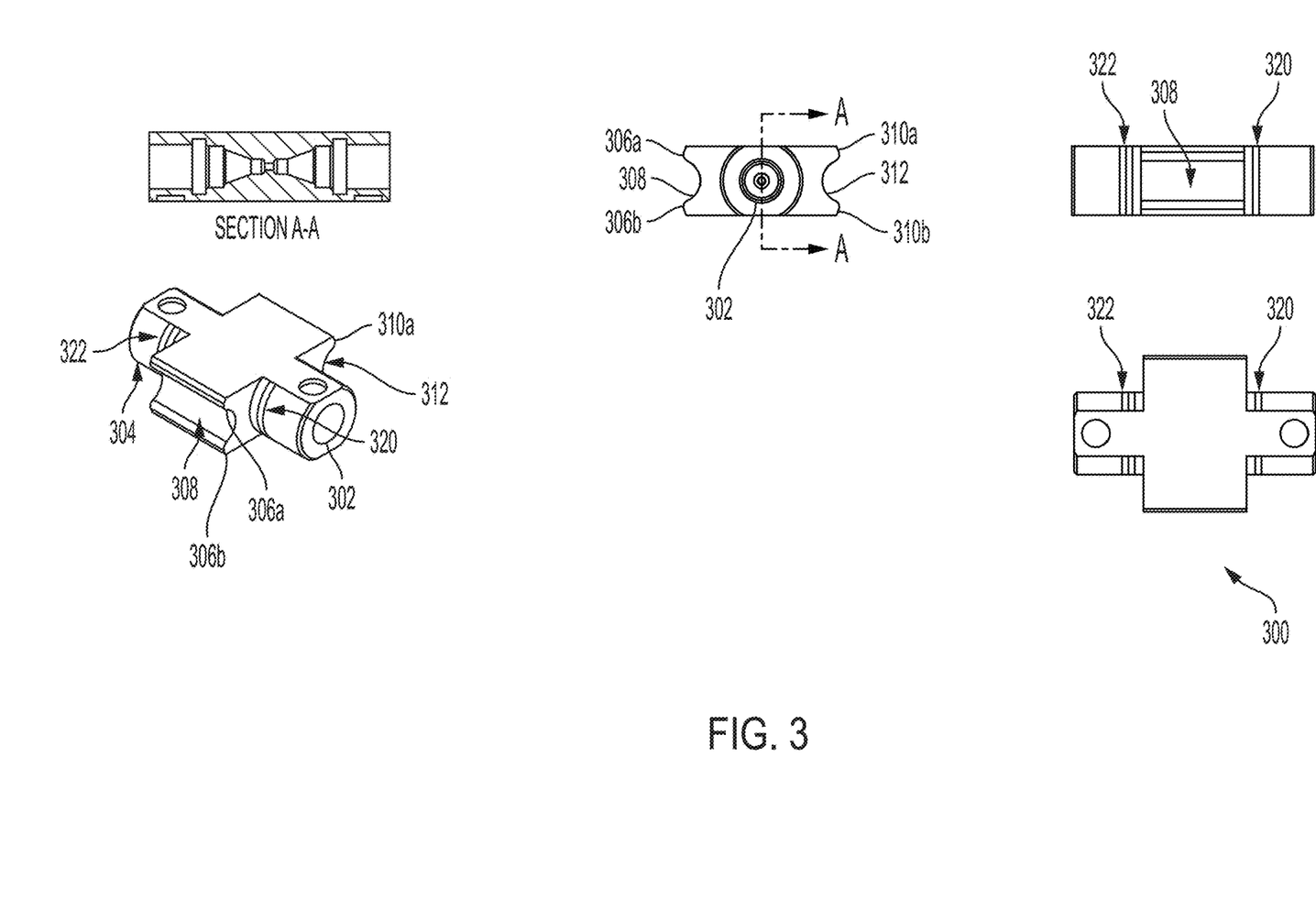
FIG. 3 provides various views of a gas chromatography union according to an embodiment of the invention.
Figure 4:
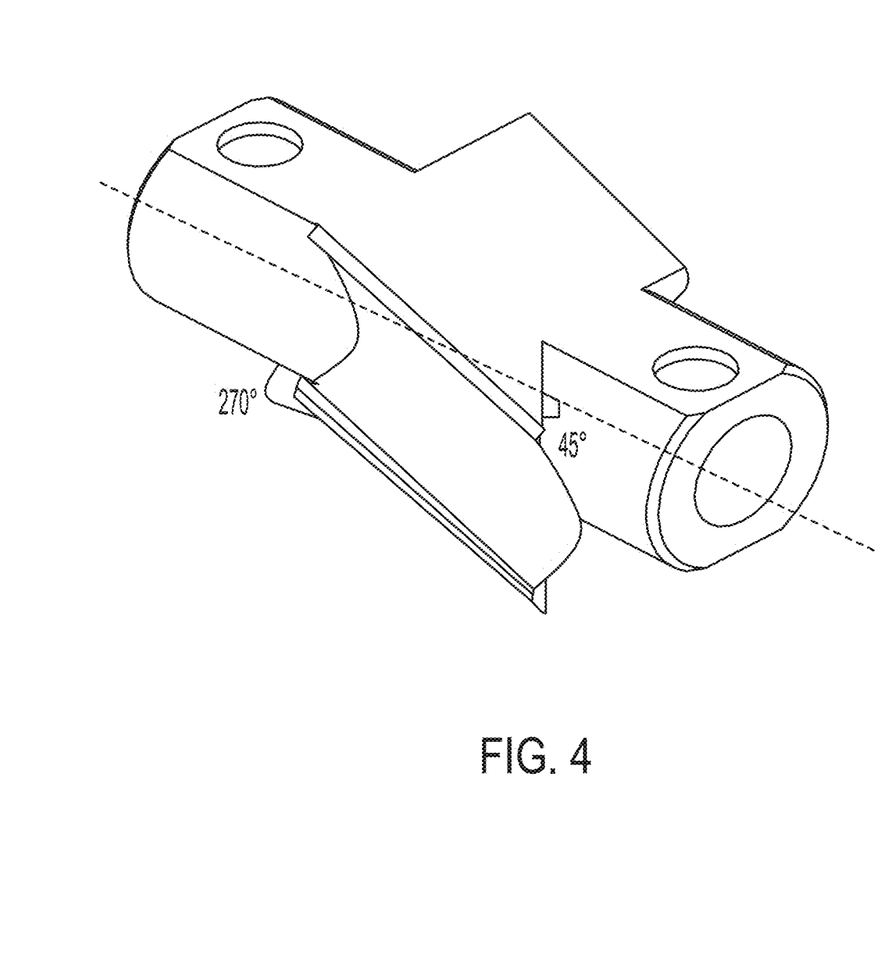
FIG. 4 provides a perspective view of a gas chromatography union according to an embodiment of the invention.

FIG. 3 illustrates an example of a gas chromatography union 300 including a first port 302, a second port 304, and first wing, protrusion, or connector or a first pair of wings, protrusions, or connectors 306a, 306b (referred to herein as "wings" for conciseness). The wings 306a, 306b can define a first recess 308. As seen, the wings 306a, 306b and first recess 308 can be lateral to an axis defined by ports 302, 304, whether angled (as depicted in FIG. 4) or parallel (as depicted in FIGS. 3 and 6A-6C). In an example, each of the wings 306a, 306b can be semi-circular.

The union 300 can be formed from a single piece of material such as metal (e.g., 316 stainless steel), plastic, polymer, glass, and the like. In an example, the material can tolerate oven temperatures (e.g., between about −80° C. and about 450° C.). The union 300 can have a thermal conductivity of less than about $$250 \frac{W}{m \cdot K},$$

less than about $$109 \frac{W}{m \cdot K},$$

less than about $$25 \frac{W}{m \cdot K},$$

less than about $$24 \frac{W}{m \cdot K},$$

less than about $$19 \frac{W}{m \cdot K},$$

less than about $$18 \frac{W}{m \cdot K},$$

less than about $$17 \frac{W}{m \cdot K},$$

and the like. In other examples, the union 300 can be formed from a metal such as aluminum (having a thermal conductivity of about $$205 \frac{W}{m \cdot K}),$$

copper (having a thermal conductivity of about $$385 \frac{W}{m \cdot K}),$$

and the like, and alloys thereof.

The union 300 may be formed through a variety of manufacturing techniques including machining, casting, molding, and the like.

The first port 302 and the second port 304 may be in fluid communication with each other. For example, the first port 302 and the second port 304 can be opposite and/or in-line with each other. The ports 302, 304 may have a suitable internal geometry to form a fluid-tight seal with a chromatography column (which typically has an outer diameter of about 2 mm). For example, the ports 302, 304 may include threads, ridges, annuluses, or other features to promote sealing. The ports can be coupled to the gas chromatography columns in a factory or in the field (e.g., using a ferrule and nut, press fitting, and the like). Although embodiments of the invention can have identical port geometries, other embodiments of the invention can have different geometries to facilitate coupling of columns having different diameters (outer and/or inner), geometries, and/or materials. In an example, to better identify the column diameter that best matches a union 300, the union 300 may include one or more indicators, such as number(s), an identification mark(s), or color(s). In an example, as shown in FIG. 3, the first port 302 may include two lines 320 indicative of the port 302 being able of receive or accept a 2 mm outer diameter column. The second port 304 may include three lines 322, indicative of the port 304 being able to receive or accept a 3 mm outer diameter column. Other indicators, such as numbers or dots in a form of a recess or protrusions may also be implemented. In an example, instead of a mark, each of the ports 302, 304 may include a specific color indicative of a predetermined size column 104. In another example, if the union 300 is capable of receiving/coupling two 3-mm diameter column 104, then the number 3 may be stamped or printed on a portion of the union 300.

Figure 5:
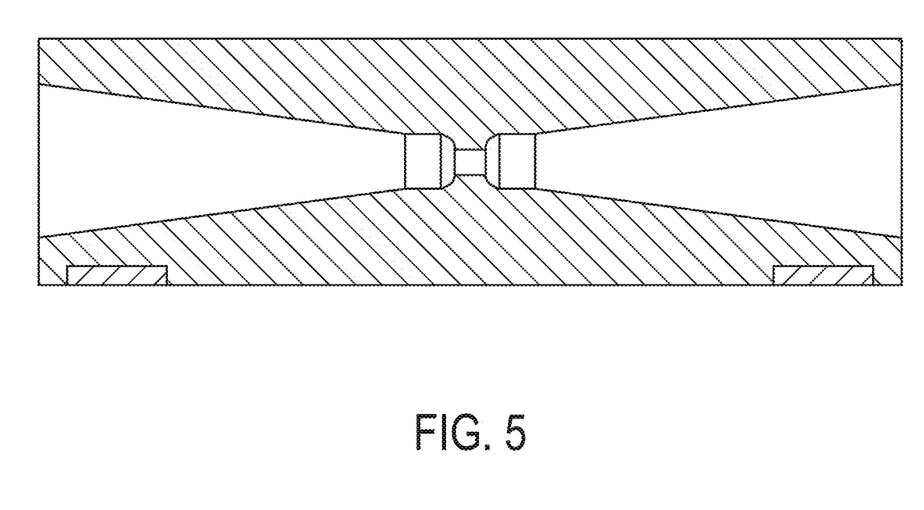
FIG. 5 is an alternative internal cross-section of a gas chromatography union according to an embodiment of the invention.

Each port 302, 304 can include a combination of a conical and cylindrical internal surfaces (as shown in FIG. 3, Section A-A), a conical and a cylindrical internal surface (as shown in FIG. 5), or a single conical internal surface (not shown). Such surfaces can facilitate swaging. In some examples, the ports 302, 304 include a substantially conical section and substantially cylindrical section.

Bridging can be associated with one or more ports to support the column 104 and/or union 300 relative to each other. Such bridging can be somewhat flexible to allow movement, but also resist kinking of the column 104.

Figure 6A:
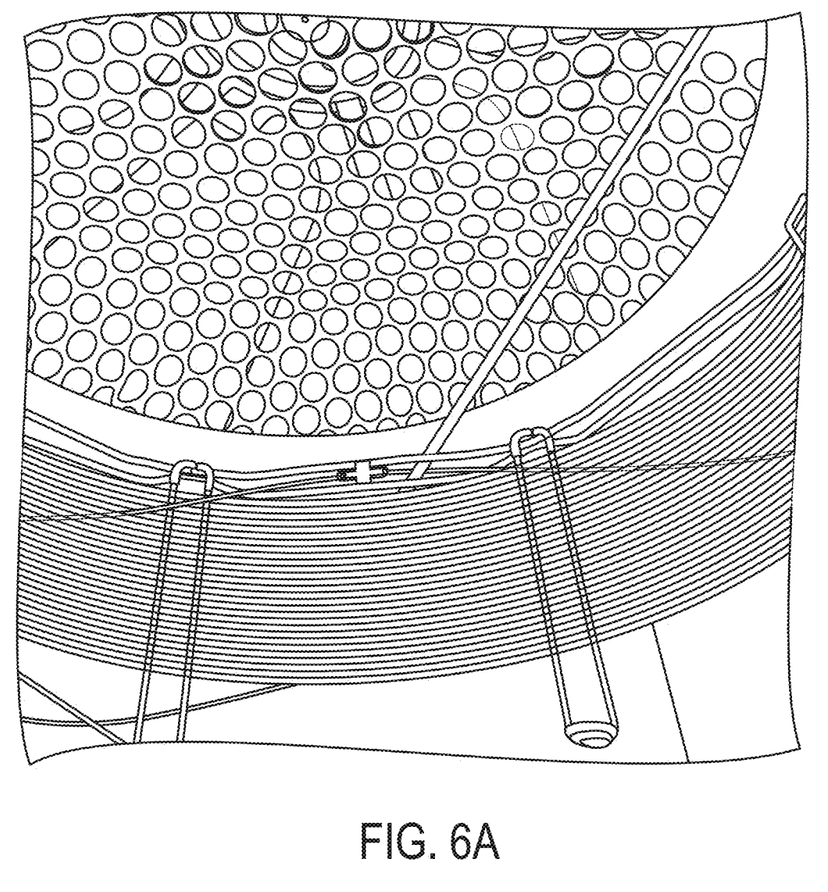
FIGS. 6A and 6B depicts a gas chromatography union according to an embodiment of the invention coupled to two gas chromatography columns and an associated gas chromatography column cage.
Figure 6B:
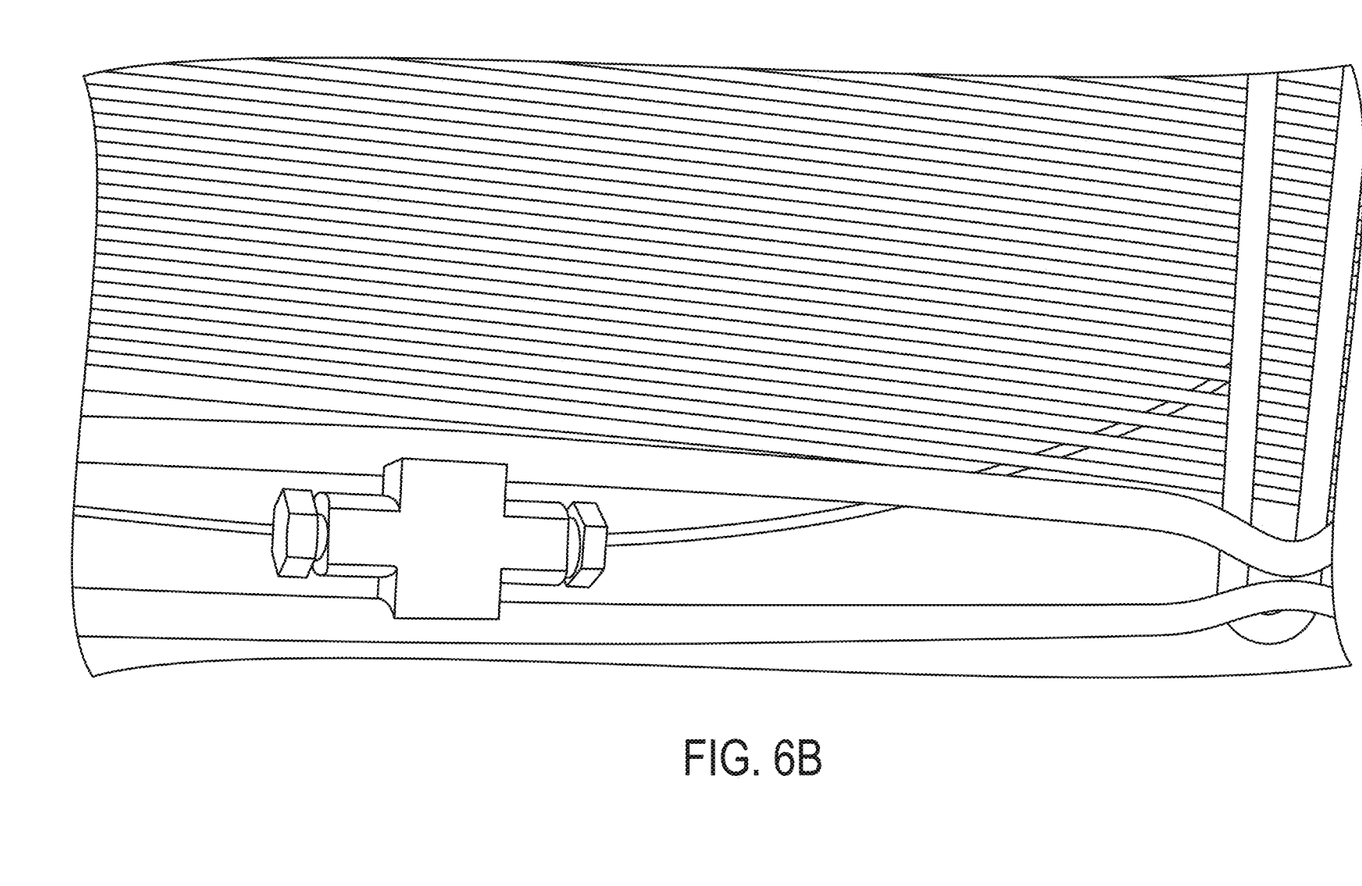
Figure 6C:
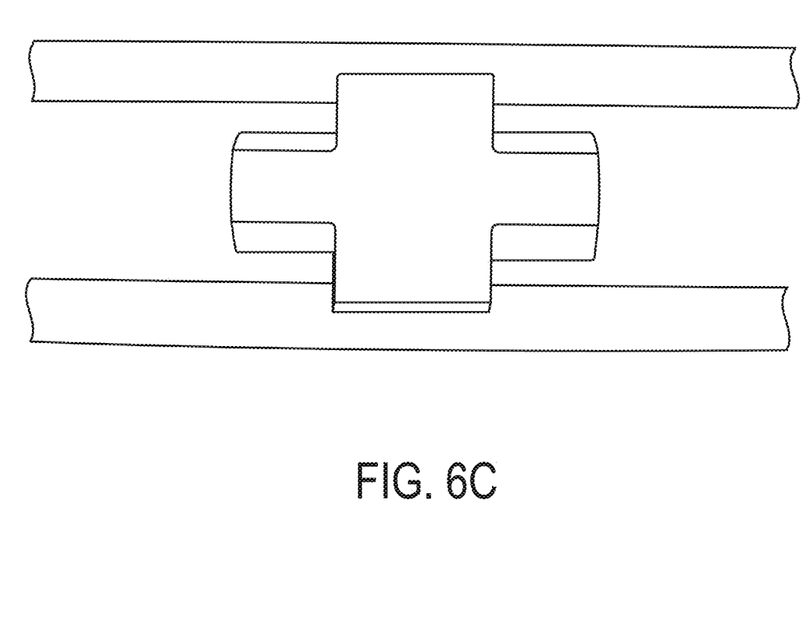
FIG. 6C depicts a gas chromatography union according to an embodiment of the invention mounted in a gas chromatography cage prior to coupling to the gas chromatography columns.

The wings 306a, 306b and the corresponding recess 308 may be adapted for engagement with one or more structures such as the gas chromatography column cage 202 (e.g., a double-wire cage) as depicted in FIG. 6A-6C, a coiled gas chromatography column, and the like. The relative shape and dimensions of wings 306a, 306b and/or recess 308 may be selected to facilitate the desired engagement. For example, the wings 306a, 306b may be engineered to flex slightly in order to grip another structure, form a snap fit (e.g., in which the gas chromatography column cage 202 flexes to receive the union 300 before returning to its original shape while lying inside recesses 308, 312), form a friction fit, and the like.

Still referring to FIG. 3, union 300 may further include a second pair of wings 310a, 310b and associated recess 312. The wings 310a, 310b and associated recess 312 may be opposite the first pair of wings 306a, 306b and associated recess 308.

Wings 306a, 306b, 310a, 310b and recesses 308, 312 may be parallel to a path between ports 302, 304 or can be angled with respect to such a path as depicted in FIG. 4. Exemplary angles are between about 5°, about 10°, about 15°, about 20°, about 25°, about 30°, between about 45° and about 270°, and the like.

Figure 7A:
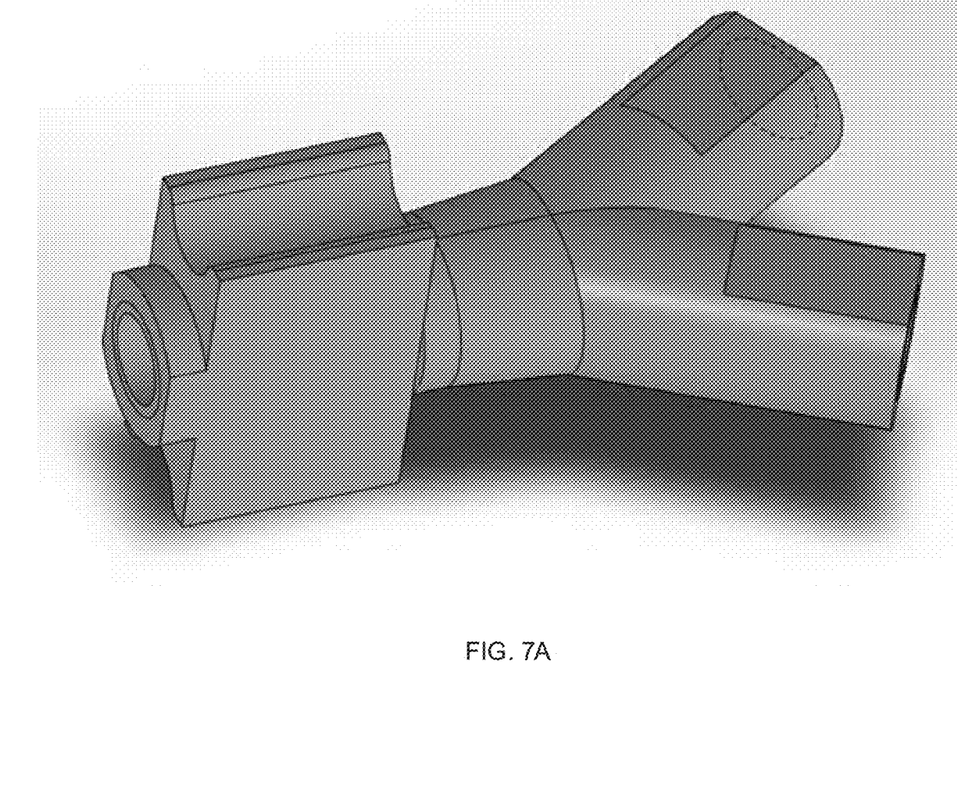
Figure 7B:
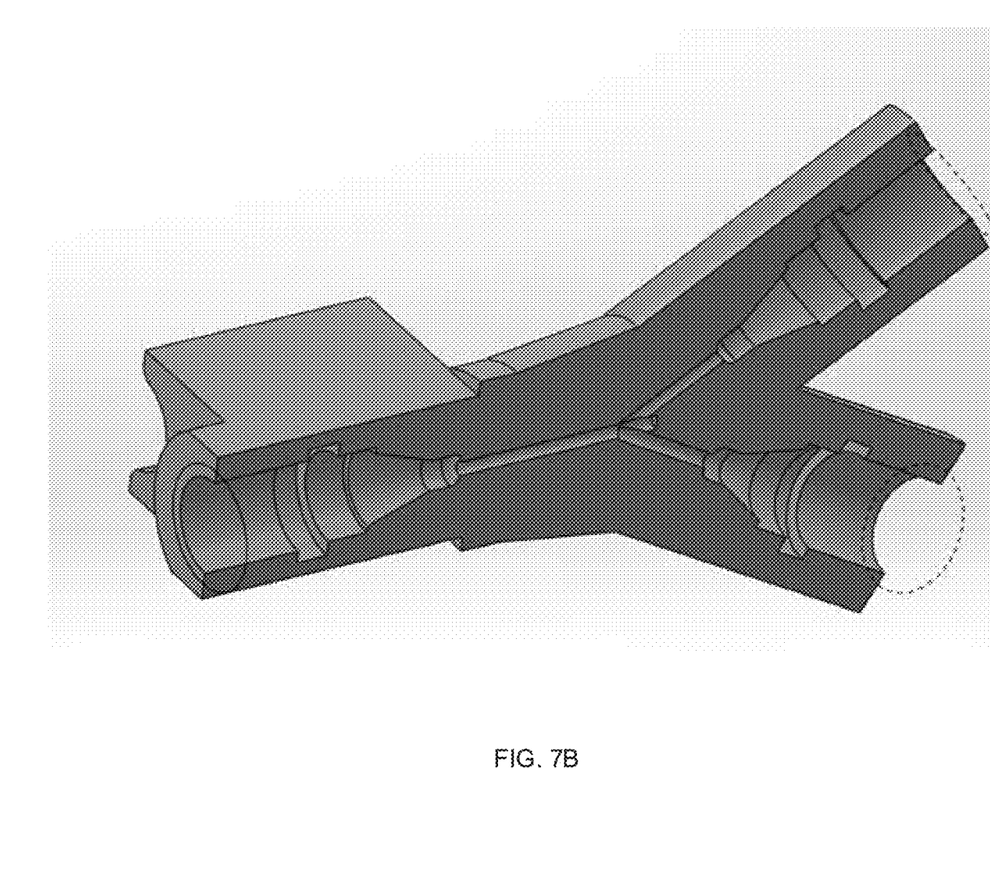
Figure 8A:
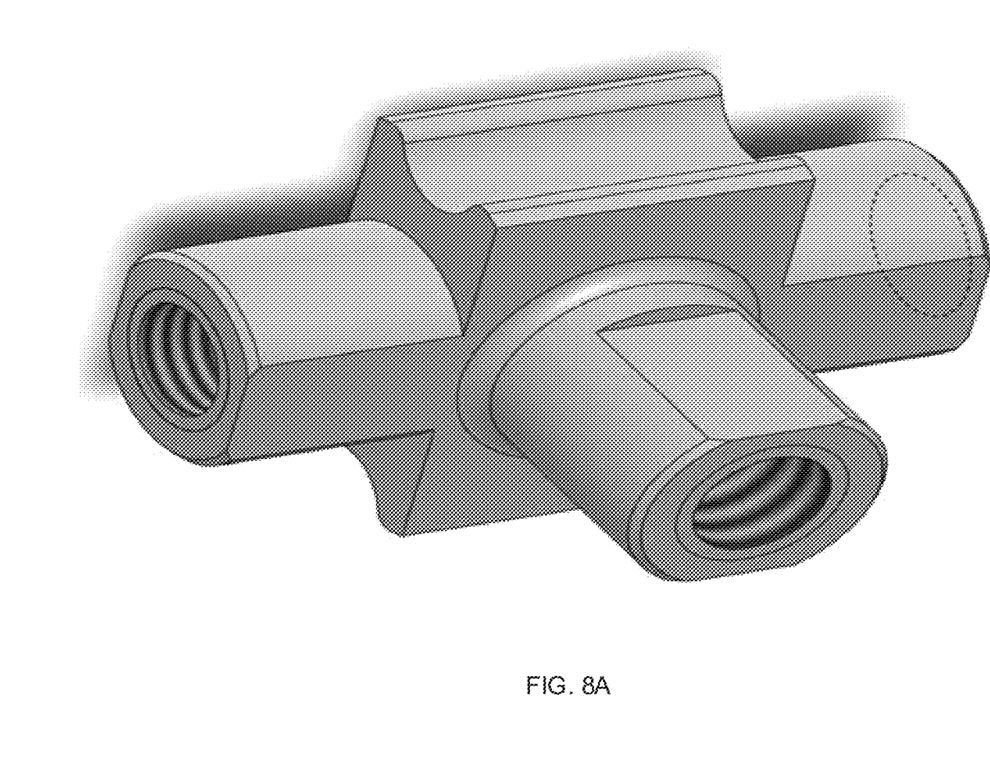
Figure 8B:
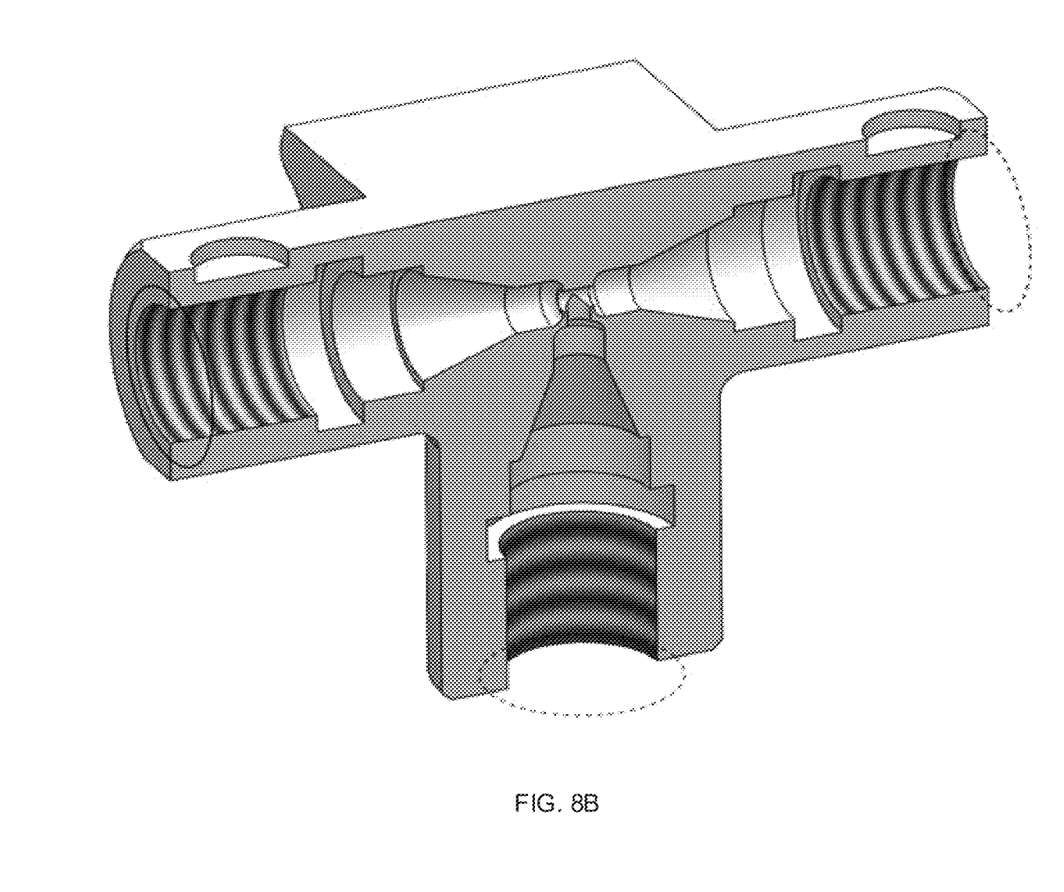

In an example, as shown in FIGS. 7A-8B, the wings may also be applied to n-port connectors, wherein n is a positive integer such as 3. As discussed, three-port connectors can be used to distribute a sample from a single input to two outputs, each coupled to a column 104. In one example, as shown in FIG. 7A, the winds may be positioned at a proximate end of one of the ports. However, the wings may also be placed at a point where the n-port connectors connect to one another.

Embodiments of the invention can be treated (e.g., using Applicant's ULTIMETAL® process) to render surfaces inert to active solutes. The small size can make the unions chromatographically invisible to solutes.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A gas chromatography union comprising:
a first port;
a second port in fluid communication with the first port;
a first pair of wings defining a first recess; and
a second pair of wings defining a second recess that is generally directly opposite to the first recess and is adapted for engagement with a portion of a gas chromatography column cage,
wherein the second recess is located generally directly opposite to the first recess to position the gas chromatography union between two adjacent components of the gas chromatograph column cage, and maintain a generally parallel relationship of the two adjacent components of the gas chromatograph column cage, and
wherein a passage between the first port and the second port is disposed between the first recess and second recess.

2. The gas chromatography union of claim 1, wherein the first recess is positioned at an angle of from about 45 degrees to about 270 degrees relative to at least one of the first port or the second port.

3. The gas chromatography union of claim 1, wherein each of the first port and second port include at least a substantially conical section.

4. The gas chromatography union of claim 1, wherein each of the first port and second port include at least one substantially conical section and at least one substantially cylindrical section.

5. The gas chromatography union of claim 1, comprising a material having a thermal conductivity of less than about $$250 \frac{W}{m \cdot K}.$$

6. The gas chromatography union of claim 1, wherein the union consists of stainless steel.

7. The gas chromatography union of claim 1, further comprising an indicator that indicates a size of columns that the chromatography union is capable of coupling to one another.

8. The gas chromatography union of claim 1, further comprising:
a third port in fluid communication with the first port and the second port.

9. The gas chromatography union of claim 8, wherein the third port is co-planar with both the first port and the second port.

10. The gas chromatography union of claim 8, wherein the third port is perpendicular to both the first port and the second port.

11. A chromatography union comprising:
a first port;
a second port in fluid communication with the first port; and
at least a first protrusion defining a first recess,
wherein the first recess is transverse at an angle of from about 45 degrees to about 270 degrees relative to a central axis of a passage defined by the first port and the second port.

12. The chromatography union of claim 11, wherein the first recess defines an internal geometric shape that allows the union to be integrated into a gas chromatography column cage.

13. The chromatography union of claim 11, further comprising at least a second protrusion defining a second recess.

14. The chromatography of claim 11, further comprising an indicator that indicates a size of columns that the union is capable of coupling to one another.

* * * * *